| United States Patent [19] | [11] | 4,241,136 |
|---|---|---|
| Dereser | [45] | Dec. 23, 1980 |

[54] GLASS FIBER SIZE COMPOSITION AND PROCESS

[75] Inventor: Ernst Dereser, Goe, Belgium

[73] Assignee: Owens-Corning Fiberglas Corporation, Toledo, Ohio

[21] Appl. No.: 16,270

[22] Filed: Mar. 5, 1979

[51] Int. Cl.³ .......................... C03C 25/02; B05D 1/36
[52] U.S. Cl. ...................................... 428/378; 264/86; 427/333; 428/392
[58] Field of Search ................ 427/333; 428/378, 392; 264/86

[56] References Cited

U.S. PATENT DOCUMENTS 3,322,592  6/1943  Rembert .............................. 138/86
3,888,645  6/1975  Marzocchi ....................... 427/333 X Primary Examiner—James R. Hoffman
Attorney, Agent, or Firm—Ronald C. Hudgens; Kenneth H. Wetmore; Keith V. Rockey

[57] ABSTRACT

A process and composition for treating glass fibers for use as reinforcement of cementitious materials. The glass fibers are first sized with a size composition containing cationic fiber forming organic polymer and then a second coating containing an anionic film-forming organic polymer is applied to the glass fibers whereby the cationic and anionic polymers react to form a thin film on the glass fiber surfaces. The resulting glass fibers have good wetting and dispersibility characteristics for use as reinforcement of cementitious materials.

22 Claims, No Drawings

GLASS FIBER SIZE COMPOSITION AND PROCESS

TECHNICAL FIELD

This invention relates to reinforced cements and to compositions for use in the manufacture of reinforced cementitious products.

BACKGROUND ART

It is now well known that various fibers can be used in the reinforcement of cementitious products. One of the more well-known reinforced cementitious products is cement reinforced with asbestos fibers. The asbestos fibers are combined with cement in the form of a built-up laminate to provide a reinforced product, such as cement pipes and cement sheets or boards and the like, having good strength characteristics.

In the manufacture of such asbestos fiber reinforced cementitious products, two processes are well known to those skilled in the art. The first is the so-called Hatschek process for the production of reinforced cementitious pipe and the second is the Magniani process for the production of boards formed of reinforced cement. In both of the processes, asbestos-fibers are mixed with a cement slurry to form a pulp, and then the pulp is placed onto a foraminous forming member (a cylinder in the case of the Hatschek process and a flat, usually endless, belt in the Magniani process). Moisture from the slurry is removed by applying suction thereto whereby water is drawn through the foraminous forming member.

The mechanism underlying the effectiveness of asbestos fibers in the manufacture of reinforced cementitious products is not fully understood at the present time. The asbestos reinforcement appears to maintain, to at least some degree, the retention of water as the reinforced cement product is being manufactured to prevent excessive dehydration which would cause the cement product to crumble.

It has been hypothesized that the high surface charge density of asbestos fibers makes them highly reactive to retain small cement particles along with water to prevent cement from being carried off with the water during dehydration on the foraminous support. That high reactivity is accentuated by the fact that the asbestos fibers have a high specific surface area (viz., of the order of 10–20 m$^2$/g). Thus, the highly reactive surfaces of the asbestos fibers are believed to flocculate the cement and retain it to provide a reinforced cement product having good structural strengths.

Various attempts have been made to omit asbestos from such reinforced cementitious products but without success. In the absence of the asbestos fibers dispersed in the cementitious material, the rate at which water can be removed so that the cementitious product can be cured is significantly reduced as a result of excessive hydration.

It has been proposed, in French Patent No. 2,317,250, to partially replace asbestos fibers with glass fibers. Even that technique has not met with any appreciable success. Glass fibers, when combined with cementitious materials in the manufacture of reinforced cementitious products have a tendency to adhere together, remaining in bundles, thereby disturbing the rate at which water can be removed through the foraminous forming member. In general, the presence of glass fibers in such reinforced cement products makes such products, in the hydrated state, too porous and causes the water present in the cement slurry to be removed too rapidly, carrying with it large quantities of the cement itself. Because glass fibers have quite low surface areas (of the order of 0.1–0.2 m$^2$/g), they do not share in the ability of asbestos to retain either cement or water. Thus, it has not been possible, up to the present invention, to form, on a Hatschek machine, reinforced cement products containing more than 2% by weight of glass fibers.

STATEMENT OF INVENTION

It is accordingly an object of this invention to provide a method for producing and to produce glass fiber-reinforced cementitious products.

It is a more specific object of this invention to provide treated glass fibers and a size composition for use in the manufacture of same wherein the size coating on the glass fibers enables the glass fibers to be distributed through a cementitious pulp and thereby regulate the rate at which water is drawn therefrom in the manufacture of glass fiber-reinforced cementitious products.

It is yet another object of the invention to provide an improved process for forming fiber reinforced cementitious products wherein glass fibers are blended with cementitious materials and then formed into a glass fiber reinforced cementitious product.

The concepts of this invention reside in the discovery that when glass fibers are sized with a size composition forming an electrically neutral coating on the glass fiber surfaces through the sequential application of a cationic and anionic film-forming size composition, the resulting coated glass fibers can be combined with cementitious materials to provide the desired wetting and dispersing characteristics in the manufacture of glass fiber reinforced cementitious products. It has been found that glass fibers which have been sized in accordance with the concepts of this invention can be employed as the sole fibrous additive to cementitious compositions in the manufacture of fiber reinforced cementitious products.

DETAILED DESCRIPTION

In accordance with the concepts of this invention, glass fibers for use as reinforcement for cementitious products are sized in a two-step operation. In the first step, the glass fibers are coated with a size composition containing as its essential component a cationic film-forming material in the form of a synthetic resinous material. Thereafter, the coated glass fibers containing the cationic film-forming material as a thin film or size coating on the surfaces of the glass fiber filaments are again coated with a second composition, the second composition containing, as an essential component, an anionic film-forming material, preferably in the form of a synthetic polymer. Without limiting the invention as to theory, it is believed that the glass fiber surfaces are, by their very nature, anionic in character. When the cationic film-forming material is applied to the glass fiber surfaces, there is a tendency for the cationic film-forming material to react with the siloxane groups forming the anionic glass fiber surfaces, and thereby result in a precipitation of the cationic film-forming material directing onto the glass surfaces. Then, as the anionic film-forming material is applied as an overcoating, the anionic film-forming material reacts with the cationic film-forming material to form an essentially neutral coating. At the same time, the reaction between the cationic and anionic film-forming materials results in a gel formation on the glass fiber surfaces. The gel thus formed is characterized by good adhesion relative to the glass fiber surfaces; it also prevents the glass fibers from adhering each to the other and to provide the desired dispersibility of the glass fibers in aqueous cementitious slurries. Thus, when the cementitious slurry containing the glass fibers treated in accordance with this invention is placed on a foraminous forming member in the manufacture of fiber reinforced cementitious products, the coated glass fibers of this invention regulate the rate at which water is removed from the cementitious fiber-containing slurry.

It has been found, in accordance with this invention, that glass fibers treated in the practice of the invention can be used as a total replacement for, or as a partial replacement for, asbestos fibers widely used in the prior art. That represents a significant savings in light of the higher cost of asbestos fibers compared to glass fibers. As the cationic film-forming material, use can be made of a number of cationic resins well known to those skilled in the art. Preferred resins are any of a group of so-called "wet-strength" resins of the sort employed in paper making applications. The resin most preferred for use in the practice of this invention is a cationic polyamide-epichlorohydrin resin marketed by Hercules Powder Co., Inc., under the tradename "Kymene 557 H". Other resins which can likewise be used, although perhaps not as effectively, are cationic urea-formaldehyde resins, such as Kymene 882 and Kymene 917.

In the preferred practice of the invention, it is sometimes desirable to include with the cationic film-forming material a reactive sizing agent to promote the adherence of the cationic film former to the glass fiber surfaces. Best results are usually achieved when the polyamide-epichlorohydrin cationic resin referred to above is blended with a reactive size formulated of an alkylketene dimer derived from fatty acids and a cationic starch, the latter serving as a protective colloid. One such reaction size is commercially available from Hercules under the trademark "Aquapel 360 XC".

When employing a reactive size in the cationic film former, the relative proportions between the two can be varied within relatively wide limits. In general, good results are achieved when the alkylketene dimer is present in an amount ranging from 0.01 to 3 parts by weight of the dimer per part by weight of the cationic film-forming material. The cationic starch, when present, is present in an amount corresponding to form 0.001 to 1 part by weight of cationic starch per part by weight of cationic film former.

The solids concentration of the cationic film former as applied to the glass fibers is likewise not critical, and can be varied within wide ranges. Good results are usually achieved when the solids concentration of the size composition containing the cationic film-forming material ranges from 0.01 to 10% solids by weight.

The anionic size composition is formulated to contain, as an essential component, an anionic film-forming material. Good results have been achieved with anionic starches. Various anionic starches are commercially available, and can be used as the anionic film-forming material. One preferred anionic starch is marketed under the tradename "Quicksol 40" by Scholten.

In addition to the anionic film former, the anionic size composition can also be formulated to include a film-forming material, preferably a vinyl resin, to insure adhesion of the anionic film former to the glass fiber surfaces. Any of a number of vinyl resins used for that purpose can be employed. Preferred is polyvinyl alcohol, such as "Mowiol 4.88", commercially available from American Hoecht Corporation. In addition, the anionic size composition can also be formulated to include a lubricant, e.g., Sodamine as well as anionic deflocculating agents such as Hercofloc 819.2. The deflocculating agent, as is well known to those skilled in the art, serves primarily as a retention aid of the size composition applied to the glass fiber surfaces.

The relative proportions of the foregoing components are not critical, and can be varied within relatively wide ranges. Generally, when employed, the vinyl resin is used in an amount ranging from 0.01 to 3 parts by weight per part by weight of the anionic film former. The lubricant, when present, constitutes from 0.001 to 2 parts by weight of lubricant per part by weight of the anionic film former and the deflocculating agent is employed in relatively low amounts sufficient to provide size retention, generally in an amount within the range of 0.001 to 0.5 parts by weight of deflocculating agent per part by weight of anionic film former.

As was the case with the cationic size, the solids concentration of the anionic size can range from 0.1 to 10% by weight, or even higher if desired.

In the application of the cationic and anionic size compositions to glass fibers, use can be made of any of a variety of known application techniques. For example, the glass fibers can be passed in contact with a roller wet with one of the size compositions. Alternatively, the size compositions can be sprayed onto the glass fibers. In either case, it is generally preferred that the cationic size composition, the one applied first, be applied as the fibers are formed to insure better adhesion between thin film or size coating on the glass fiber surfaces.

Glass fibers used in the practice of this invention can be "E" glass fibers, well known to those skilled in the art; such fibers are described in U.S. Pat. No. 2,334,961. Preferred glass fibers used in the practice of this invention, however, are alkali-resistant glass fibers. Such glass fibers are now well known to those skilled in the art, and are described in U.S. Pat. Nos. 3,840,379, 3,861,927 and 3,861,926.

In combining glass fibers treated in accordance with this invention with cementitious material, use can be made of any of a number of cements of the same type employed in the art. Suitable cementitious materials include cement, Portland cement, concrete, mortar, gypsum, hydrous calcium silicate, etc. The treated glass fibers, generally in an amount ranging from 1 to 25% by weight based upon the weight of the cement, are blended with a cement slurry, either with or without the addition of other fibers such as asbestos fibers. When such other fibers are used, they are generally present in an amount ranging from 1–10% by weight based upon the weight of the cementitious material. The pump resulting from blending the fibers and the cementitious material is then placed in contact with a foraminous forming member in accordance with the well-known Hatschek or Magniani processes and a vacuum applied to the foraminous member to remove water from the fiber-reinforced cementitious product. The product is then cured in accordance with the conventional techniques.

The resulting fiber reinforced cementitious product is characterized by high strength, and can be used as various building materials in accordance with well-known principles of the prior art.

Having described the basic concepts of the invention, reference is now made to the following examples which are provided by way of illustration, and not by way of limitation, of the practice of this invention in the treatment of glass fibers with the size compositions of this invention and the use of the treated glass fibers in the manufacture of glass fiber reinforced cementitious products.

EXAMPLE 1

This example illustrates the preparation and use of the size compositions of this invention.

Two size compositions are formulated in accordance with the following:

| Cationic Size Composition | Parts by Weight |
|---|---|
| Polyamide-epichlorohydrin (Kymene 557 H - 12.5% solids by weight) | 15 |
| Blend of dimer of fatty acid-derived alkylketene plus cationic starch (Aquapel 360 X2 - 7.7% solids by weight)* | 15 |

| Anionic Size Composition | Parts by Weight |
|---|---|
| Anionic starch (Quicksol 40) | 15 |
| Polyvinyl alcohol (Mowiol 4.88) | 15 |
| Lubricant (Sodamine CA) | 5 |
| Deflocculating agent (Hercofloc 819.2) | 1 |

*Aquapel contains approximately 6% by weight of the dimer and 2% by weight of the cationic starch.

Each of the above size compositions is combined with water to make up a suspension having a solids content of 2.5% by weight solids.

In preparing the anionic size composition described above, the 15 parts by weight of Quicksol 40 are mixed with water at 65°-70° C. for approximately ten minutes, and then the resulting mixture is agitated for another 30 minutes. Thereafter, the Sodamine dissolved in water is added to the anionic starch. The polyvinyl alcohol is heated to 75° C. to solubilize the resin, cooled to room temperature and then added to the starch mix, after which the deflocculating agent is added in water. The resulting composition is then adjusted to a solids content of 2.5%.

The foregoing size compositions are applied to glass fibers by spraying. Glass fibers issuing from a glass melting furnace are first sprayed with the cationic size composition described above. The resulting fibers coated with the cationic size composition are then sprayed with the anionic size composition described above before the glass fibers are gathered as a roll. The resulting fibers have a gel-like coating on the surfaces thereof, the coating exhibiting good adhesion to the glass fiber surfaces.

EXAMPLE 2

This example illustrates the use of glass fibers treated in accordance with the practice of this invention in the manufacture of glass fiber reinforced cementitious pipe. Glass fibers treated in accordance with Example 1 are blended with cement along with white asbestos fibers. The glass fibers, chopped to lengths of about 1 to 3 inches, are employed in an amount corresponding to about 10% by weight based upon the weight of the cement, and the white asbestos fibers are employed in an amount corresponding to about 3% by weight based upon the weight of the cement. The pulp thus formed is then processed in a Hatschek machine to form fiber reinforced cement pipes having good strength characteristics.

It will be understood that various changes and modifications can be made in the details of procedure, formulation and use without departing from the spirit of the invention, especially as defined in the following claims.

I claim:

1. Glass fibers having a coating thereon, said coating being formed by first coating the glass fibers with a cationic size composition containing a cationic film-forming organic polymer and then coating the resulting glass fibers with an anionic size composition containing an anionic film-forming organic polymer whereby the cationic and anionic polymers react to form a thin film on the glass fibers.

2. Glass fibers as defined in claim 1 wherein the cationic film-forming polymer is a cationic polyamide-epichlorohydrin resin.

3. Glass fibers as defined in claim 1 wherein the anionic film-forming polymer is an anionic starch.

4. Glass fibers as defined in claim 1 wherein the cationic size composition also includes a reactive size in the form of an alkylketene dimer.

5. Glass fibers as defined in claim 1 wherein the reactive size also includes a cationic protective colloid.

6. Glass fibers as defined in claim 1 wherein the protective colloid is a cationic starch.

7. Glass fibers as defined in claim 1 wherein the anionic size also includes a vinyl resin.

8. Glass fibers as defined in claim 1 wherein the anionic size composition includes a lubricant.

9. Glass fibers as defined in claim 1 wherein the anionic size composition includes a deflocculating agent.

10. A process for treating glass fibers for use as reinforcement for cementitious materials comprising the steps of coating glass fibers with a cationic size composition containing a cationic film-forming organic polymer and then coating the resulting glass fibers with an anionic size composition containing an anionic film-forming organic polymer whereby the cationic and anionic polymer react each with the other to form a thin film on the glass fiber surfaces.

11. A process as defined in claim 10 wherein the cationic film-forming polymer is a cationic polyamide-epichlorohydrin resin.

12. A process as defined in claim 10 wherein the anionic film-forming polymer is an anionic starch.

13. In a process for the manufacture of fiber-reinforced cementitious products wherein fibers are mixed with a cementitious material to form a pulp, the pulp is contacted with a foraminous forming member in which water is withdrawn to form a green product and the green product is cured, the improvement comprising forming the pulp with glass fibers having a coating thereon, said coating being formed by first coating the glass fibers with a cationic size composition containing a cationic film-forming organic polymer and then coating the resulting glass fibers with an anionic size composition containing an anionic film-forming organic polymer whereby the cationic and anionic polymers react to form a thin film on the glass fibers.

14. A process as defined in claim 13 wherein the cationic film-forming polymer is a cationic polyamide-epichlorohydrin resin.

15. A process as defined in claim 13 wherein the anionic film-forming polymer is an anionic starch.

16. A process as defined in claim 13 wherein the cationic size composition also includes a reactive size in the form of an alkylketene dimer.

17. A process as defined in claim 13 wherein the reactive size also includes a cationic protective colloid.

18. A process as defined in claim 13 wherein the anionic size also includes a vinyl resin.

19. In a glass fiber reinforced cementitious product formed of a cementitious material constituting a continuous phase in which coated glass fibers are distributed as reinforcement, the improvement comprising a coating on the glass fibers, said coating having been formed by first coating the glass fibers with a cationic size composition containing a cationic film-forming organic polymer and then coating the resulting glass fibers with an anionic size composition containing an anionic film-forming organic polymer whereby the cationic and anionic polymers react to form a thin film on the glass fibers.

20. A product as defined in claim 19 wherein the cationic film-forming polymer is a cationic polyamide-epichlorohydrin resin.

21. A product as defined in claim 19 wherein the anionic film-forming polymer is an anionic starch.

22. A product as defined in claim 19 wherein the cationic size composition also includes a reactive size in the form of an alkylketene dimer.

* * * * *

UNITED STATES PATENT AND TRADEMARK OFFICE
CERTIFICATE OF CORRECTION

PATENT NO. : 4,241,136
DATED : December 23, 1980
INVENTOR(S) : ERNST DERESER

It is certified that error appears in the above—identified patent and that said Letters Patent is hereby corrected as shown below:

Column 4, line 56 should read:

the weight of the cementitious material. The pulp

Signed and Sealed this

Twenty-fifth Day of August 1981

[SEAL]

Attest:

Attesting Officer

GERALD J. MOSSINGHOFF

Commissioner of Patents and Trademarks